Figure 1:
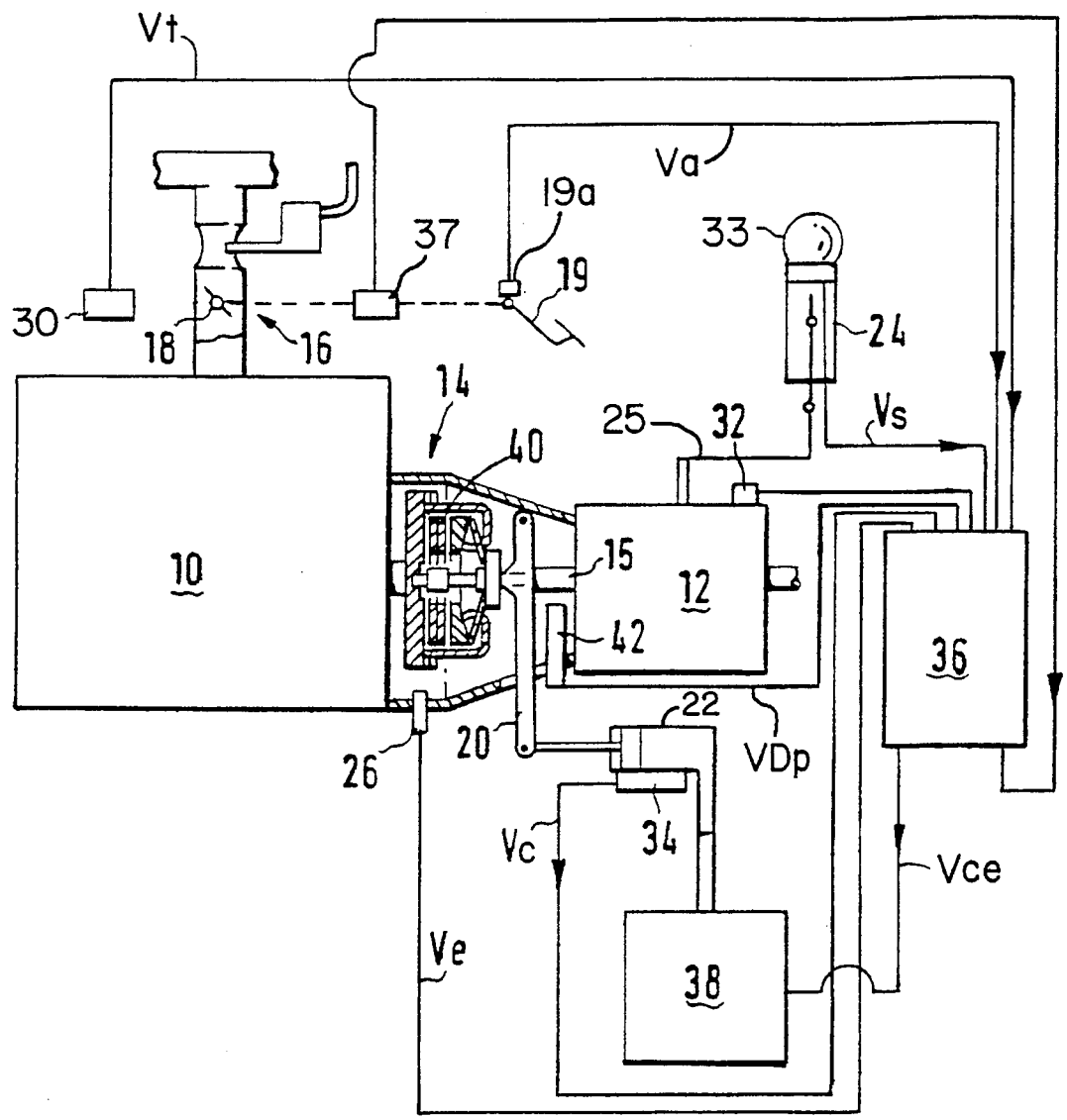

United States Patent
Jarvis et al.

[11] Patent Number: 5,595,550
[45] Date of Patent: Jan. 21, 1997

[54] CLUTCH CONTROL SYSTEM

[75] Inventors: Roger P. Jarvis, Leominster; Charles J. Jones, Coventry, both of United Kingdom

[73] Assignee: Automotive Products, plc, Leamington Spa, England

[21] Appl. No.: 532,697
[22] PCT Filed: Jan. 30, 1995
[86] PCT No.: PCT/GB95/00184
  § 371 Date: Feb. 7, 1995
  § 102(e) Date: Feb. 7, 1995
[87] PCT Pub. No.: WO95/21070
  PCT Pub. Date: Aug. 10, 1995

[30] Foreign Application Priority Data

Feb. 1, 1994 [GB] United Kingdom .................. 9401900

[51] Int. Cl.$^6$ .............................. B60K 41/02; F16H 61/04
[52] U.S. Cl. ................................................. 477/84; 477/91
[58] Field of Search .......................................... 477/84, 91

[56] References Cited

U.S. PATENT DOCUMENTS 4,324,322 4/1982 Sibeud ..................................... 477/78
4,727,472 2/1988 Deutsch et al. ......................... 364/183
4,899,623 2/1990 Wokan et al. ........................... 477/111

FOREIGN PATENT DOCUMENTS 101220  2/1984 European Pat. Off. .
512727 11/1992 European Pat. Off. .

*Primary Examiner*—Dirk Wright
*Attorney, Agent, or Firm*—Paul E. Milliken; Lee A. Germain

[57] ABSTRACT

A clutch control system for the automatic control of a motor vehicle clutch which connects an engine with a gearbox under the control of a driver-operated gear ratio selector lever. The control system controls both initial clutch take-up on starting of the vehicle, clutch re-engagment following each ratio change, clutch disengagment on movement of the gear selector lever to change the operative ratio of the gearbox, and clutch disengagment on coming to rest, etc. of the vehicle. Additionally the clutch control system includes an anti-baulking routine which is enabled if the gear selector lever is in its neutral position and which when enabled allows engagement of the clutch by increasing the engine speed above an idle level.

14 Claims, 2 Drawing Sheets

CLUTCH CONTROL SYSTEM

This invention relates to a clutch control system for the automatic control of a motor vehicle clutch which connects an engine with a gearbox under the control of a driver-operated gear ratio selector lever, the control system controlling both initial clutch take-up on starting of the vehicle, clutch re-engagement following each ratio change, clutch disengagement on movement of the gear selector lever to change the operative ratio of the gearbox, and clutch disengagement on the coming to rest etc. of the vehicle. Such a clutch control system is herein after referred to as a clutch control system of the kind specified.

Examples of such systems are described in the Applicants earlier European patents Nos 0038113, 0043660, 0059035 and 0101220 and European Application No 0566595.

Problems can arise with such systems if, with the vehicle stationary, the operator moves the gear selector lever to select the initial drive take-up ratio and finds his movement of the gear selector lever baulked by the non-alignment of the gear teeth to be engaged in the gearbox.

It is an object of the present invention to overcome the above baulking problem.

Thus according to the present invention there is provided a clutch control system of the kind specified in which, if the gear lever is in the neutral position, an anti-baulking routine is enabled which allows engagement of the clutch by increasing the engine speed above an idle level.

Typically the clutch will be arranged to be fully engaged at an engine speed of say 1500 r.p.m. and by temporarily increasing engine speed with the gearbox in neutral the relevant gears can be spun so that any baulking situation which exists will be removed.

The system ensures that with the engine idling the clutch is disengaged thus preventing idle rattle.

The level of clutch engagement achieved by the anti-baulking routine may be proportional to the actual engine speed or to the position of the accelerator pedal or hand throttle lever or butterfly throttle valve (or diesel injector pump setting) or to a combination of one or more of these parameters as appropriate.

The clutch engagement cycle when in neutral may operate with hysteresis so that, for example, engagement commences at 1000 r.p.m. and is completed by 1500 r.p.m. whilst subsequent clutch disengagement does not begin until 1000 r.p.m. and is not completed until 800 r.p.m. This hysteresis feature is particularly helpful since it allows engine driven accessories to be operated with the engine speed being controlled via the accelerator or a hand throttle control. The progressive clutch engagement with increasing engine speed ensures a soft start for any such accessories.

Figure 2:
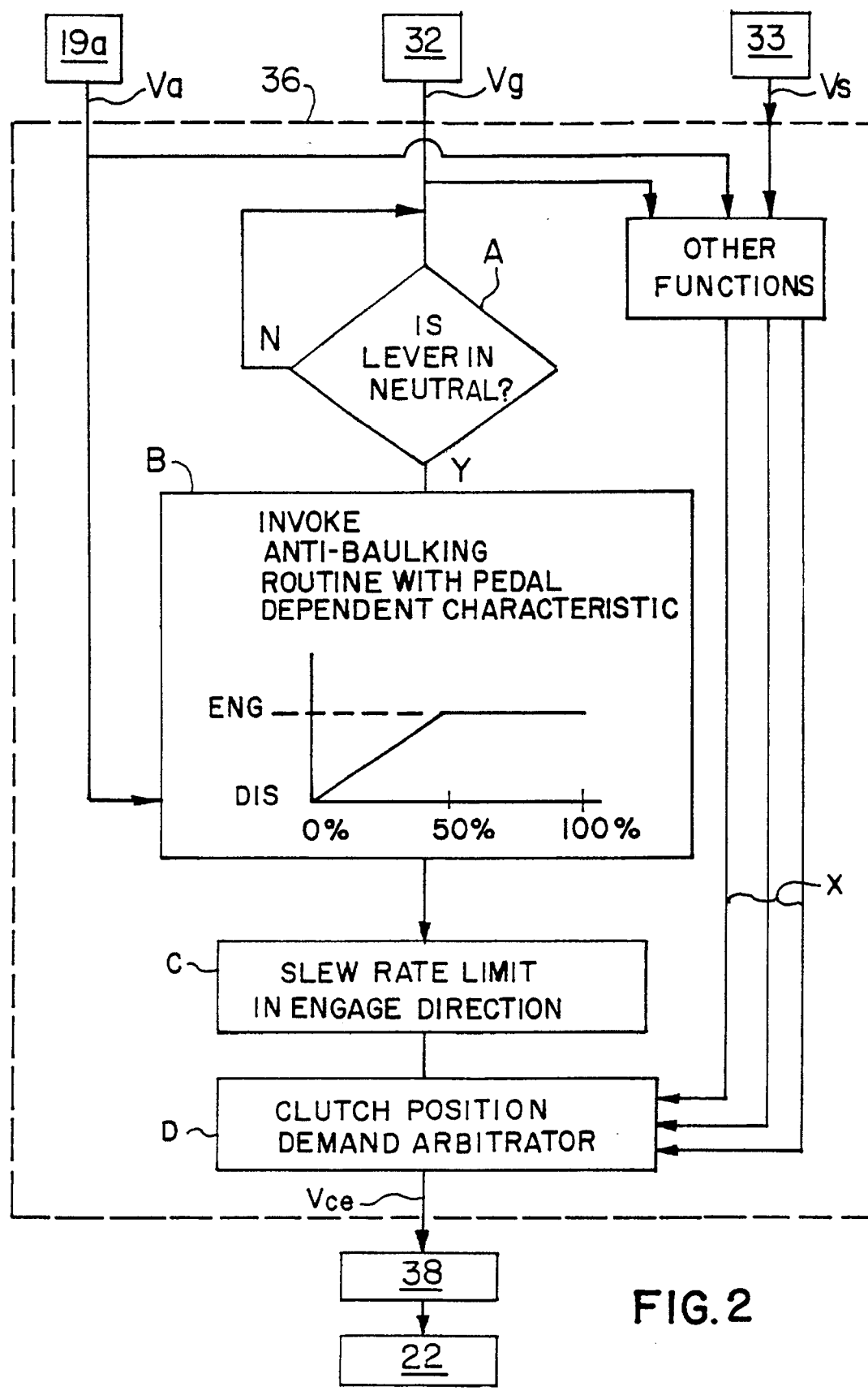

One embodiment of the present invention will now be described, by way of example only, with reference to the accompanying drawings in which:

FIG. 1 shows in diagrammatic form the general layout of a clutch control system of the kind specified embodying the present invention, and FIG. 2 is a data flow diagram of the anti-baulking routine of the present invention.

Referring to FIG. 1 this shows an engine 10 and a gearbox 12 coupled through a friction clutch 14, via a gearbox input shaft 15. Fuel is supplied to the engine by a throttle 16 which includes a throttle valve 18 operated by accelerator pedal 19. The clutch 14 is actuated by release fork 20, which is operated by a slave cylinder 22. The gearbox is controlled by a gear ratio selector lever 24 which is connected with the gearbox via selector linkage 25 and which includes a load-sensing switch means 33 which detects forces applied to the lever 24 by the driver and produces a signal Vs indicating an intention to change gear.

A control unit 36 controls the actuation of the clutch 14 via an hydraulic control 38 which controls the operation of slave cylinder 22. Control unit 36 receives signals Vs from gear lever 24 and signals Ve proportional to engine speed from engine speed sensor 26. Signals Vt from throttle valve position sensor 30 proportional to the current throttle opening and accelerator pedal position signals Va from an accelerator position sensor 19a are also fed to control unit 36. Control unit 36 also receives a gear signal Vg from gear position sensor 32 which corresponds to the gear ratio currently engaged, signals Vc from slave cylinder position sensor 34, which varying with the position of the slave cylinder, and signals Vdp proportional to clutch driven plate speed from speed sensor 42 which actually senses the speed of the gearbox input shaft 15 (which is equal to that of a driven plate 40 of the clutch 14). Since the speed of the vehicle depends on the driven plate speed and the gear engaged, the driven plate speed sensor 42 acts in effect, as a vehicle speed sensor, A throttle control 37 is operated by the control unit 36 so that the throttle can be opened and closed independently of the accelerator pedal 19.

Control unit 36 includes a reference signal generator which generates a reference signal representative of a desired engine speed. This reference signal is compared with the actual engine speed signal Ve to produce an error signal which is compared with the clutch actuator position signal Vc to provide a clutch engagement control signal Vce which control unit 36 outputs to hydraulic control 38. Operation of a control unit in this manner is described in more detail, for example, in the Applicants earlier European Patents 0038113 and 0043660. Since the general details of the control logic of control unit 36 do not form part of the present invention further details will not be given here but the reader is directed to the Applicants various earlier patents and pending application referred to above if further details are required.

In addition to controlling the engagement and disengagement of clutch 14 the control unit 36 also controls the throttle setting via control 37 when its control logic indicates that an overide of the throttle opening set by the driver's operation of the accelerator 19 is desirable. In some variants of the system no provision to overide the throttle opening set by the driver is provided.

In accordance with the present invention the control unit 36 senses whenever the gear selector lever 24 is in its neutral position via sensor 32 and, if the accelerator pedal depressed whilst the gearbox is in neutral, an anti-baulking routine is invoked which progressively engages the clutch.

This routine is shown in the form of a data flow diagram in FIG. 2. The control unit 36 receives signals Va and Vg from accelerator sensor 19a and gear position sensor 32 respectively. In box A signal Vg is used to detect when neutral is selected when the anti baulking routine (box B) and the slew rate limit (box C) are applied by the control unit.

The anti-baulking routine is arranged to progressively engage the clutch in a linear fashion so that the clutch is fully disengaged when the accelerator is released and fully engaged at 50 per cent of the total accelerator pedal travel. This linear characteristic is shown in box B of FIG. 2.

A slew rate limiter (box C) guards against the rapid depletion of the hydraulic pressure level which the hydraulic control 38 can supply should the accelerator be subjected to repeated throttle blipping by limiting the rate at which the clutch can engage.

The clutch engagement signal of the anti-baulking routine is fed via the slew rate limiter into a control unit arbitrator (box D) which prioritises the signals from the anti-baulking routine with any other clutch engagement/ disengagement signals (diagrammatically indicated at X in FIG. 2) which may be currently being generated by other parts of the control unit 36 so that the current clutch engagement/disengagement signal Vce emerges from the arbitrator and operates the hydraulic control 38 to cause clutch actuator 22 to engage the clutch to the appropriate level.

Thus should the driver experience baulking of the movement of gear lever 24 when he attempts to select a particular gear he simply returns the lever 24 to neutral, increases the engine speed to invoke clutch engagement which will cause the relevant baulking gears to spin relative to each other so that they will engage at the next attempted engagement, and then decreases the engine speed to disengage the clutch and allow the next attempt to engage the previously baulked ratio.

At the first sign of any gear lever movement (signal Vs from sensor 33) the anti-baulking routine is terminated to immediately disengage the clutch irrespective of engine speed so that the system can respond immediately to the new driver command.

In an alternative anti-baulking routine instead of measuring accelerator position and controlling clutch engagement accordingly, as indicated by the linear characteristics of box B of FIG. 2, the routine may be based on the measurement of engine speed so that if the engine speed is increased above a nominal idle level of say 800 r.p.m., indicated for example by signal Ve from sensor 26, the anti-baulking routine is invoked within control unit 36 to begin engagement of the clutch.

Typically the anti-baulking routine will commence clutch engagement at say 1000 r.p.m. and will ensure full clutch engagement at say 1500 r.p.m. with the gear lever in neutral.

The engine speed may be derived directly from an engine speed sensor 26, as described above, or from an engine fuel management controller, if the engine is fitted with such a device, depending on which is most convenient in a given installation.

In certain installations the level of clutch engagement may be controlled in response to a mixture of accelerator pedal position and engine speed. In other installations hand throttle position and/or throttle butterfly valve position may be used as the control variable to command the level of clutch engagement.

In diesel engine applications the control variable may be the diesel injector pump setting rather than the accelerator pedal position.

In diesel installations in which the accelerator pedal is connected to the injector pump via an electronic diesel control which, for example, suppresses blipping of the accelerator to reduce unwanted engine emissions it may be necessary to use a mixture of accelerator pedal position and engine speed as the control variable which determines the level of clutch engagement.

No matter what is used as the control variable the anti-baulking routine may include hysteresis so that, for example using engine speed as the control variable, clutch engagement will commence at 1000 r.p.m. and be complete at 1500 r.p.m. but clutch disengagement will not commence until engine speed has dropped to 1000 r.p.m. and will not be complete until idle speed (e.g. 800 r.p.m.) is reached. As will be appreciated the present invention thus provides a simple but effective expedient through which the problem of the baulking of forward or reverse gear selection can be easily overcome by the operator.

The invention also allows engine driven accessories to be operated with the engine speed being controlled via the accelerator or a hand throttle control. The progressive clutch engagement with increasing engine speed ensures a soft start for any such accessories..

We claim:

1. A clutch control system for the automatic control of a motor vehicle clutch (14) which connects an engine (10) with a gearbox (12) under the control of a driver-operated gear ratio selector lever (24), the control system controlling initial clutch take-up on starting of the vehicle, clutch re-engagement following each ratio change, clutch disengagement on movement of the gear selector lever to change the operative ratio of the gearbox, and clutch disengagement on the coming to rest etc. of the vehicle, the clutch control system being characterised in that, if the gear selector lever (24) is in its neutral position, an anti-baulking routine is enabled which allows engagement of the clutch (14) by increasing the engine speed (Ve) above an idle level.

2. A system according to claim 1 characterised in that the level of clutch engagement achieved by the anti-baulking routine is proportional to the position of an accelerator pedal (19) which controls the engine (10).

3. A system according to claim 2 characterised in that the anti-baulking routine progressively engages the clutch (14) in a linear fashion dependent on accelerator pedal position (Va).

4. A system according to claim 3 characterised in that the clutch (14) is fully engaged at fifty per cent of the total accelerator pedal travel.

5. A system according to claim 1 characterised in that the level of clutch engagement achieved by the anti-baulking routine is proportional to the actual speed (Ve) of the engine (10).

6. A system according to claim 5 characterised in that the clutch (14) is fully engaged at engine speeds above 1500 rpm.

7. A system according to claim 1 characterised in that the level of clutch engagement achieved by the anti-baulking routine is proportional to the position of a hand throttle lever or butterfly throttle valve or diesel injector pump control member which controls the engine.

8. A system according to claim 1 characterised in that the anti-baulking routine operates with hysteresis so that the clutch is disengaged at a lower speed from that at which it is engaged.

9. A system according to claim 2 characterised in that the anti-baulking routine operates with hysteresis so that the clutch is disengaged at a lower speed from that at which it is engaged.

10. A system according to claim 3 characterised in that the anti-baulking routine operates with hysteresis so that the clutch is disengaged at a lower speed from that at which it is engaged.

11. A system according to claim 4 characterised in that the anti-baulking routine operates with hysteresis so that the clutch is disengaged at a lower speed from that at which it is engaged.

12. A system according to claim 5 characterised in that the anti-baulking routine operates with hysteresis so that the clutch is disengaged at a lower speed from that at which it is engaged.

13. A system according to claim 6 characterised in that the anti-baulking routine operates with hysteresis so that the clutch is disengaged at a lower speed from that at which it is engaged.

14. A system according to claim 7 characterised in that the anti-baulking routine operates with hysteresis so that the clutch is disengaged at a lower speed from that at which it is engaged.

* * * * *